United States Patent [19]

Campbell

[11] Patent Number: 4,642,641
[45] Date of Patent: Feb. 10, 1987

[54] VARIABLE PRF TARGET TRACKING RADAR

[75] Inventor: Robert R. Campbell, Towson, Md.

[73] Assignee: Westinghouse Electric Corp., Pittsburgh, Pa.

[21] Appl. No.: 709,678

[22] Filed: Jul. 29, 1976

[51] Int. Cl.⁴ .............................................. G01S 13/12
[52] U.S. Cl. ..................................... 342/82; 342/134
[58] Field of Search ........................... 343/7.5, 17.1 PF

[56] References Cited

U.S. PATENT DOCUMENTS

| | | | |
|---|---|---|---|
| 3,023,409 | 2/1962 | Smith et al. | 343/17.1 PF X |
| 3,155,973 | 11/1964 | Smith | 343/7.5 X |
| 3,258,769 | 6/1966 | Forestier | 343/7.5 |
| 3,334,344 | 8/1967 | Colby, Jr. | 343/7.5 |
| 3,341,847 | 9/1967 | Fried et al. | 343/17.1 PF X |

FOREIGN PATENT DOCUMENTS 1408289 10/1975 United Kingdom .................. 343/7.5

Primary Examiner—Thomas H. Tarcza
Assistant Examiner—Bernarr Earl Gregory
Attorney, Agent, or Firm—W. G. Sutcliff

[57] ABSTRACT

A high PRF pulse doppler radar for tracking moving targets is described wherein the PRF of the transmitted signal is varied within predetermined PRF limits to keep the target reflected high PRF signal centered within the receive gate of the radar and wherein spurious signals incidentally generated by the action of the receive gate are reduced below the receiver noise level. In the event of temporary target reflected signal loss, the PRF of the transmitted signal is varied within predetermined PRF limits based upon the velocity and range estimate of the target to keep subsequent target reflected signals centered within the receive gate of the radar.

14 Claims, 12 Drawing Figures

VARIABLE PRF TARGET TRACKING RADAR

GOVERNMENT CONTRACT

The invention herein described was made in the course of or under a contract or subcontract thereunder with the Department of the Air Force.

BACKGROUND OF THE INVENTION

1. Field of the Invention

This invention relates to target tracking radar, particularly to high PRF pulse doppler tracking radar.

2. Description of the Prior Art

In the prior art, a high PRF pulse doppler radar is used in the search mode to detect a target. The target velocity is determined by the location of the target reflected signal in the doppler filter bank in the search receiver of the radar. The coarse range of the target is determined in the search receiver by utilizing the radar in an FM ranging mode. The high PRF pulse doppler radar is then operated in the track mode whereby the track channel, using a narrow band pass filter, is tuned to the target's doppler frequency. If the target reflected signals are not centered exactly within the receive gate of the radar receiver, there will be loss in target signal power which will reduce the signal to noise ratio. The non-alignment of target reflected signals with respect to the receive gate of the radar receiver is referred to as eclipsing loss. If target reflected signals are received outside the receive gate, the eclipsing loss is total, which is also known as a blind range since the arrival of target reflected signals with respect to the receive gate are dependent upon the range of the target and the PRF of the radar. As a consequence, multiple PRF's are used to reduce eclipsing losses in the track mode.

A typical high PRF waveform would have a 45% transmit time, followed by a 10% receiver recovery time, and a 45% receive time for one interpulse period. A typical PRF would be 250 KHz.

During track, a single PRF is used until the target reflected signal is lost or no longer in the receive gate. The loss of signal may be due to eclipsing loss or due to target scintillation where the aspect of the target results in a weaker target reflected signal or signal fade-out. The loss in target reflected signals in the track mode is assumed due to eclipsing loss or a blind range. The unambiguous range for a typical PRF of 250 KHz is about 0.32 nautical miles resulting in blind ranges at multiples of 0.32 nautical miles. Upon loss of target reflected signals a second PRF is used and if the target reflected signals are not reacquired in the receive gate after some period of time, another PRF is used. A typical number of PRF's is 3 to 5 for a radar in the track mode. After sequentially trying these PRF's several times without reacquiring the target, the track receiver is tuned to see if the target has changed doppler frequency due to a change in radial velocity with respect to the radar antenna. If the target is still not reacquired, the radar is returned to the search mode.

Several methods to reduce the effects of blind ranges during tracking have been used such as selecting subsets of PRF's as a function of coarse target range or selecting PRF switching sequences for nominal target velocities. Certain PRF values, however, result in spurious signals due to modulation of the main beam clutter by the receive gate which signals can fall within the tracking pass band and interfere with the tracking performance of the radar. The PRF values which can be used for tracking must exclude these PRF values. As a result, use of multiple PRF's to reduce blind ranges is far from perfect. For example, a typical tracking radar using 5 PRF's requires 5 to 10 dB of additional signal to noise, depending upon the target range, to overcome eclipsing loss.

In view of the prior art, it is therefore desirable to eliminate eclipsing loss or loss of the target reflected signal in the receive gate by continuously varying the PRF of the transmitted high PRF signal to keep the target reflected signal within the receive gate of the radar receiver. The radar receiver therefore receives most or all of the target reflected signal on a continuous basis during track. The effective signal to noise ratio of the target reflected signal is increased which is important for tracking long range targets. In addition, the target reflected signal is not lost periodically in the receive gate of the radar receiver which would require reacquisition of the signal which may lead to periods of signal loss and to possible track loss.

It is desirable when the target reflected signal is weak or lost due to target scintillation to continue to vary the PRF of the transmitted high PRF signal to keep subsequent target reflected signals within the receive gate of the radar receiver to avoid signal loss in the receive gate which would require reacquisition of the target reflected signal which may lead to unnecessary periods of signal loss and to possible track loss.

It is desirable to reduce the level of spurious signals caused by intermittent receiver operation below the receiver noise level of the radar receiver to permit utilization of all PRF values within a predetermined upper and lower PRF limit for tracking a target.

SUMMARY OF THE INVENTION

In accordance with the present invention, a method and apparatus is provided for tracking a moving target wherein the coarse range of said target is independently provided. Such method and apparatus for tracking provides for generating and transmitting a high PRF signal, receiving a reflected high PRF signal indicative of a target during a predetermined time between pulses of said high PRF signal, reducing spurious signals below a predetermined level, the spurious signals being incidentally generated by receiving reflected high PRF signals during the predetermined time, generating a velocity signal in accordance with an acquired target, generating an error signal corresponding to the portion of the reflected high PRF signal received during predetermined time intervals and modifying the PRF of the transmitted signal in accordance with target velocity, coarse range and said generated error signal to increase the portion of the reflected signal received during the predetermined time interval.

DESCRIPTION OF THE PREFERRED EMBODIMENTS

Figure 1:
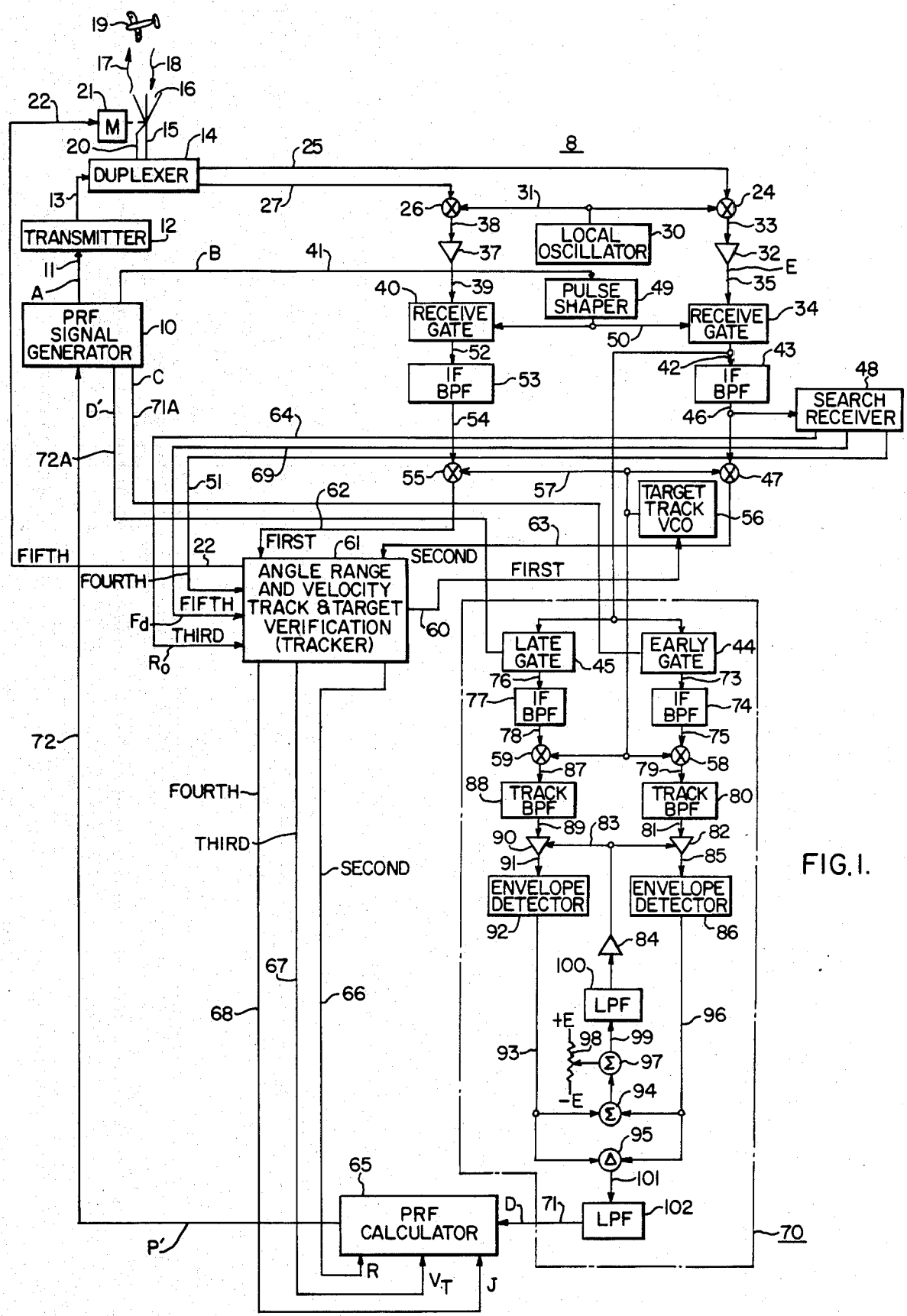
FIG. 1 is a block diagram of one embodiment of the invention.

Referring to FIG. 1, PRF signal generator 10 is coupled over line 11 to transmitter 12. PRF signal generator functions to generate a high PRF signal graphically shown, for example, as curve A in FIG. 2. A typical duty cycle or the on time for the high PRF signal is 45% of the interpulse period. Transmitter 12 functions to generate a carrier signal which is modulated on and off by the high PRF signal from generator 10. Transmitter 12 is coupled over line 13. Duplexer 14 is coupled over line 15 to the sum channel of antenna 16. Duplexer 14 functions to connect the sum channel of antenna 16 to transmitter 12 when transmitter 12 has a signal to transmit. Antenna 16 radiates high PRF signals 17. Target reflected high PRF signals such as from target 19 are received by antenna 16 which has a sum and difference channel. The difference channel is coupled to the duplexer over line 20. Duplexer 14 and antenna 16 are conventional in the art. The mechanical orientation of antenna 16 is governed by motor 21 controlled by a signal over line 22 from tracker 61.

Received target reflected signals 18 pass through antenna 16 and out the sum and difference channel over lines 15 and 20, respectively, to duplexer 14. Duplexer 14 couples the sum channel or line 15 to first mixer 24 over line 25. The difference channel or line 20 is coupled by the duplexer 14 to first mixer 26 over line 27. The duplexer 14 functions to couple the sum channel of antenna 16 to the first mixer 24 and the difference channel of antenna 16 to the first mixer 26 during the receive time of pulse doppler radar 8. A typical frequency of the carrier for the high PRF signals 17 is 10 GHz. Target reflected signals 18 will have a carrier frequency close to 10 GHz but separated in frequency due to the doppler effect on signals 18 by moving target 19. Local oscillator 30 is coupled to an input of first mixer 24 and first mixer 26 over line 31. A typical frequency for local oscillator 30 is 9.7 GHz. The output of first mixer 24 is coupled to amplifier 32 over line 33. The output of amplifier 32 is coupled to an input of receive gate 34 over line 35. First mixer 24 functions to mix the frequency of local oscillator 30 with the frequency of target reflected signals 18 received from the sum channel of antenna 16. One of the output products of first mixer 24 is the difference frequency of the two input signals which for 10 GHz and 9.7 GHz would be about 300 MHz center frequency with a ±100 KHz due to doppler frequency effect which is the intermediate frequency of the reciever. Amplifier 32 functions to amplify the output of mixer 24. The output of mixer 26 is coupled to amplifier 37 over line 38. The output of amplifier 37 is coupled over line 39 to an input of receive gate 40.

An output from PRF signal generator 10 is coupled over line 41 through pulse shaper 49 and over line 50 to an input of receive gate 34 and an input of receive gate 40. Receive gate 34 and 40 functions to determine a predetermined time interval for receiving signals by passing the input signal through to the output under the control of PRF signal generator 10. A typical control signal from PRF signal generator 10 over line 41 is shown by curve B in FIG. 2. A typical duty cycle for the received time for a high PRF radar is 45%, which is during a time after the transmitter pulse has been transmitted and the receiver circuits have fully recovered from any leakage of the transmitted pulse.

Receive gate 34 is coupled over line 42 to the input of intermediate frequency (IF) band pass filter (BPF) 43, to early gate 44 and late gate 45. IF band pass filter 43 has a center frequency of 300 MHz with a band pass of ±100 KHz. The output of IF band pass filter 43 is coupled over line 46 to track mixer 47 and to search receiver 48. The output of receive gate 40 is coupled over line 52 to IF band pass filter 53. Band pass filter 53 has a center frequency of 300 MHz with a ±100 KHz band pass. The output of band pass filter 53 is coupled over line 54 to track mixer 55. Target track VCO 56 is coupled over line 57 to track mixer 55, track mixer 47, mixer 58 and mixer 59. Target track VCO 56 has a typical center frequency of 299 MHz with a variation of ±100 KHz governed by a control signal over line 60 from tracker 61. The output of track mixer 55 is coupled over line 62 to an input of tracker 61. The output of track mixer 47 is coupled over line 63 to a second input of tracker 61. An output of search receiver 48 coarse target range signal $R_o$, is coupled over line 64 to a third input of tracker 61. An output of search receiver 48, a timing signal, is coupled over line 51 to a fourth input of tracker 61 and output signal $F_d$ is coupled over line 69 to a fifth input of tracker 61. Tracker 61 functions to provide angle, range, velocity and target verfication. Tracker 61 is conventional in the art. A first output of tracker 61 provides a signal over line 60 to target track VCO 56 which is a function of the velocity of the target being tracked. A second output of tracker 61 is coupled to PRF calculator 65 over line 66 which may have a signal indicative of target range. A third output of tracker 61 is coupled over line 67 to PRF calculator 65 which may have a signal indicative of target velocity. A fourth output of tracker 61 is coupled over line 68 to PRF calculator 65 which may have a signal indicative of target verification. PRF calculator 65 also has an input from early late gate circuitry 70 over line 71. The output of PRF calculator 65 is coupled over line 72 to PRF signal generator 10. PRF calculator 65 functions to calculate the new PRF of the radar based upon its input signals in accordance with predetermined formulas to provide a variable PRF wherein target reflected signals are kept within the center of receive gates 34 and 40.

Early late gate circuitry 70 provides an input signal to PRF calculator 65 which provides an indication whether the received target reflected signals 18 are received early or late with respect to the receive time, the predetermined time interval, which is controlled by the signal on line 41 from PRF signal generator 10 at receive gate 34. The output of the receive gate 34 is coupled over line 42 to the input of early gate 44 and the input of late gate 45. An output signal from PRF signal generator 10 is coupled over line 71 to early gate 44. Early gate 44 functions to sample the early part or a first part of the receive gate time, the predetermined time interval, to determine the coincidence or portion of target reflected signals 18 received. A typical early gate signal over line 71A is shown by curve C in FIG. 2. An output from PRF signal generator 10 is coupled over line 72A to late gate 45. A typical late gate signal over line 72A is shown by curve D' in FIG. 2. Late gate 45 functions to sample the later portion or second part of the receive gate time, the predetermined time interval, to determine the coincidence or portion of target reflected signals 18 received. The output of early gate 44 is coupled over line 73 to IF band pass filter 74. The output of band pass filter 74 is coupled over line 75 to mixer 58. Typical characteristics for band pass filter 74 is for a filter with a center frequency of 300 MHz with a band pass of ±100 KHz. The output of late gate 45 is coupled over line 76 to band pass filter 77. The output of band pass filter 77 is coupled over line 78 to mixer 59. Band pass filter 77 may, for example, have a center frequency of 300 MHz with a band pass of ±100 KHz. An output from target track VCO 56 is coupled over line 57 to mixers 58 and 59. The output of mixer 58 is coupled over line 79 to track band pass filter 80. Track band pass filter 80 may, for example, have a center frequency of 1 MHz and a band pass of ±500 Hz. The output of band pass filter 80 is coupled over line 81 to amplifier 82. The gain of amplifier 82 is controlled by a signal over line 83 from amplifier 84. The output of amplifier 82 is coupled over line 85 to envelope detector 86. Mixer 59 is coupled over line 87 to track band pass filter 88. Track band pass filter 88 may, for example, have a center frequency of 1 MHz with a band pass of ±500 Hz. The output of track band pass filter 88 is coupled over line 89 to amplifier 90. The output of amplifier 84 is coupled over line 83 to the gain control input of amplifier 90. The signal over line 83 functions to control the gain of amplifiers 90 and 82. The output of amplifier 90 is coupled over line 91 to envelope detector 92. The output of envelope detector 92 is coupled over line 93 to an input of adder 94 and an input of subtractor 95. The output of envelope detector 86 is coupled over line 96 to an input of adder 94 and an input of subtractor 95. The output of adder 94 is coupled to an input of adder 97. One side of potentiometer 98 is coupled to +E volts and the other side is coupled to −E volts. The tap of potentiometer 98 is coupled to an input of adder 97. Potentiometer 98 functions to provide a gain control reference to the output signal from adder 94. The output of adder 97 is coupled over line 99 to low pass filter 100. Low pass filter 100 typically may have a band pass from 0 to 10 Hz. The output of low pass filter 100 is coupled to the input of amplifier 84. Amplifier 84 functions to provide a feedback gain control signal to amplifiers 90 and 82 to provide uniform voltage levels at the outputs of amplifiers 90 and 82 while permitting its input signals to have wide dynamic range. This allows subtractor 95 to provide an output over line 101 to an input of low pass filter 102 wherein the signal is an indication of the alignment of target reflected signals 18 with respect to the time receive gate 34 is open, which is determined by PRF signal generator 10. Low pass filter 102 typically has a band pass from 0 to 10 Hz. The output of low pass filter 102 is coupled over line 71 to PRF calculator 65.

Figure 2:
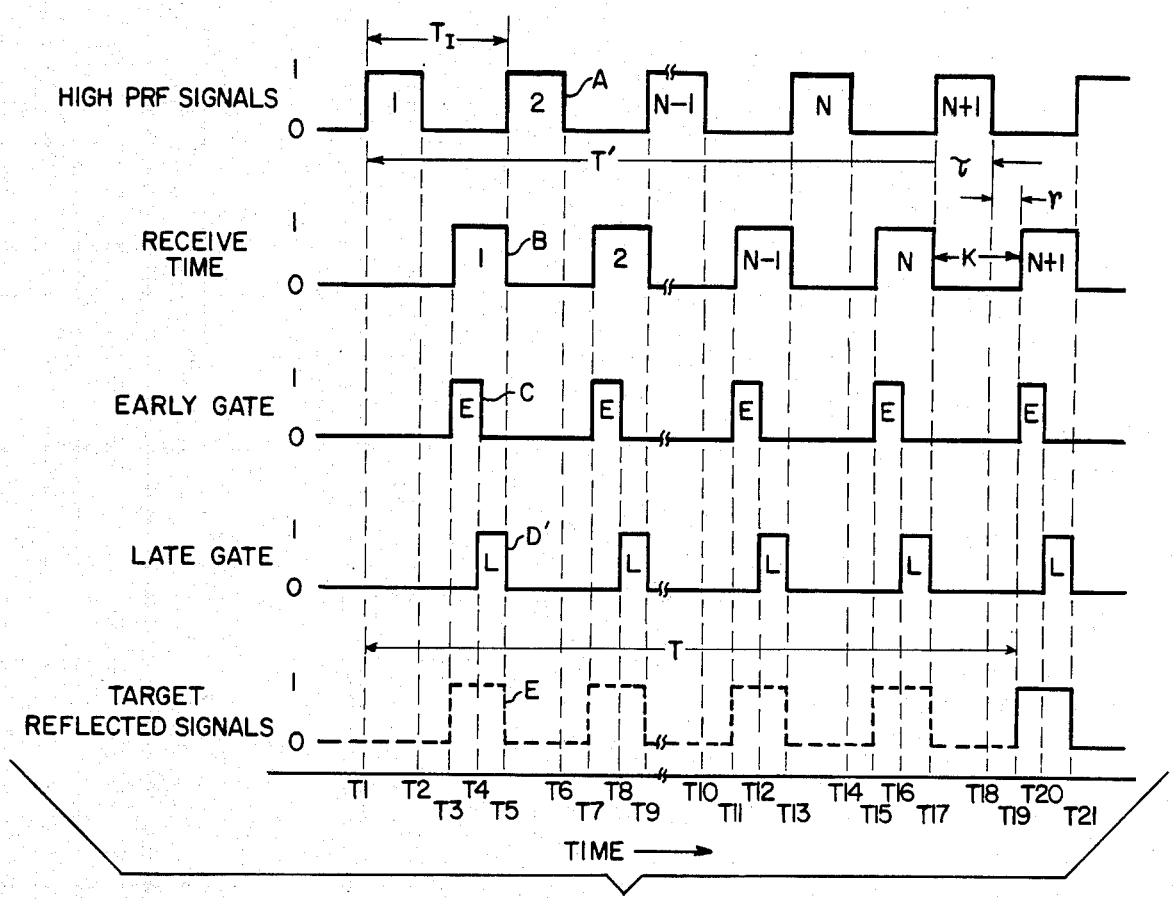
FIG. 2 shows typical waveforms for the embodiment of FIG. 1.

Referring now to FIG. 2, typical waveforms are shown for the operation of the embodiment as shown in FIG. 1. Curves A–E are shown with the ordinate representing the logic level of 0 or 1 and the abscissa representing time. Curve A represents high PRF signals constituted by a series of time-spaced pulses which may be generated by PRF signal generator 10 and transmitted as high PRF signals 17. Curve B represents the received time as generated by the PRF signal generator 10 on line 41 and has the same PRF as the high PRF signals 17 shown in curve A. When the PRF of the signals of curve A are varied, the PRF of the signals of curve B are likewise varied such that the received time or predetermined time interval will always occur between transmitted pulses. Curve C occurs during the first portion of the received time and curve D' occurs at the later portion of the received time. Curves C and D' are likewise varied in PRF when the high PRF signals 17 are varied. Curves C and D' maintain their same relationship with respect to the received time pulses in curve B. Curve E represents target reflected signals 18 which are shown in alignment with the received time pulses of curve B. Reflected signals 18 may, however, be misaligned or shifted in time with respect to the received time pulse of curve B (not shown). The time of arrival of reflected signals 18, curve E, are dependent upon the transit time of the transmitted high PRF signals 17 from the radar 8 to the target and back to the pulse doppler radar 8. An example of transit time T for target reflected signals 18 is shown in curve E. Pulses received earlier in time are shown in phantom.

Figure 3:
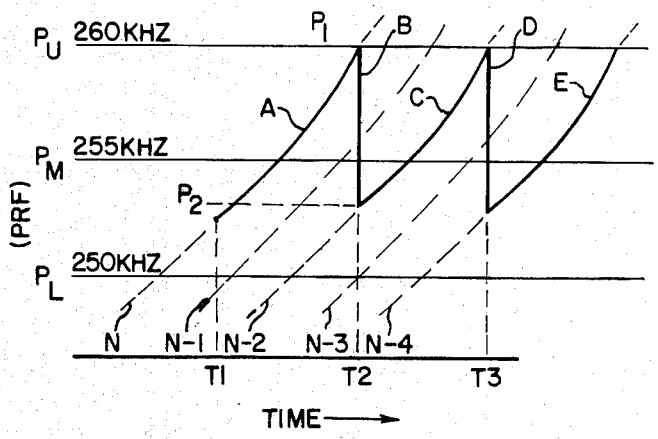
FIG. 3 graphically shows the variation of PRF with time for tracking a closing target (not to scale)

Referring to FIG. 3, curve A represents the variation of PRF of pulse doppler radar 8 using high PRF signals 17 for tracking a closing target. The PRF increases with time to keep the target return centered within the receive gate 34 in FIG. 1. The ordinate represents the PRF and the abscissa represents the time. A closing target has a decrease in transit time and a decrease in range as the target moves toward the pulse doppler radar 8. The target is acquired in range ambiguity N. In other words, N pulses are transmitted before a target reflected signal 18 is received. When the PRF reaches a maximum PRF value, such as 260 KHz, the PRF is jump backed or lowered to range ambiguity N-2 such as shown as curve B in FIG. 3. On curve C at time T2 the target is tracked with a PRF centered within the receive gate or receive time such as curve B in FIG. 2. The starting PRF at time T2 was the lowest PRF above the minimum PRF limit where the target return will be centered within the receive gate. The PRF increases with time for a closing target to keep the target return centered within the receive gate. At time T3 the maximum PRF has been reached and the PRF is again lowered to a lower range ambiguity such as N-4 as shown by curve D at time T3. The target is therefore tracked by varying the PRF of the high PRF signals to keep the target reflected signals 18 centered within the receive gate 34 in FIG. 1 or occurring at predetermined time intervals as shown by curve B in FIG. 2. A typical value for the upper limit may be for example 260 KHz and a typical value for the lower limit may be, for example, 250 KHz. The mean PRF then would be midway between the upper and lower limit or 255 KHz.

Figure 4:
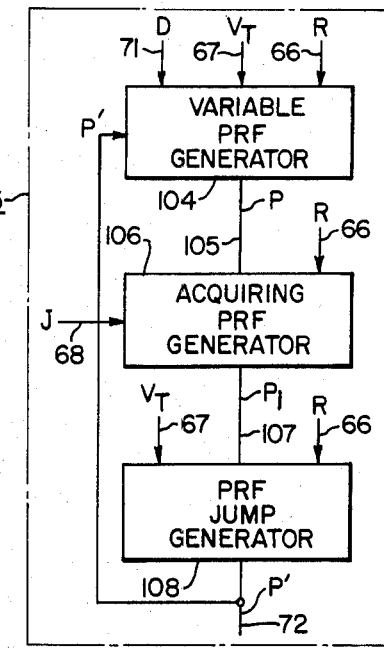
FIG. 4 is a block diagram of one embodiment of a PRF calculator.

Referring now to FIG. 4, an example of a more detailed embodiment of PRF calculator 65 is shown for determining the PRF in accordance with target velocity, $V_T$, range, R, target verification, J, and an error signal, D, corresponding to the portion of the reflected signal 18 received during the received time in the receive gate 34. Lines 66, 67 and 71 carry signals representative of range, velocity and early/late gate error (D) respectively are coupled to variable PRF generator 104 which functions to calculate a new PRF at frequent intervals such as represented by increments of time along curve A in FIG. 3, such that reflected high PRF signals are received during predetermined time intervals in the receive gate 34. The output of variable PRF generator 104 is coupled over line 105 to an input of acquiring PRF generator 106. Line 66 and line 68 carrying signals representative of range and target verification respectively are coupled to acquiring PRF generator 106. Acquiring PRF generator 106 functions to vary the PRF such that target reflected signals are received during predetermined time intervals in the receive gate 34 when the target reflected signals are received primarily outside of the predetermined time interval. The output of acquiring PRF generator 106 is coupled over line 107 to an input of PRF jump generator 108. Lines 66 and 67 carrying signals representative of range and target velocity respectively are also coupled to PRF jump generator 108. PRF jump generator 108 functions to generate a change in the PRF such that the number of range ambiguities to the target is increased or decreased by an integral number. An example of a change in PRF that would be provided by jump PRF generator 108 is shown by curve B and D in FIG. 3. By providing PRF jump generator 108, the PRF of the high PRF radar may be maintained between an upper and lower PRF limit while tracking a target. The circuitry for PRF calculator 65 may be analog or digital and at certain stages during track the operation of only one of generators 104, 106 or 108 may be necessary. For example, while tracking a target along curve A, C or E of FIG. 3, only variable PRF generator 104 is necessary and the output signal on line 105 is not modified by generators 106 or 108 with output line 72 having the same signal as on line 105.

Figure 5:
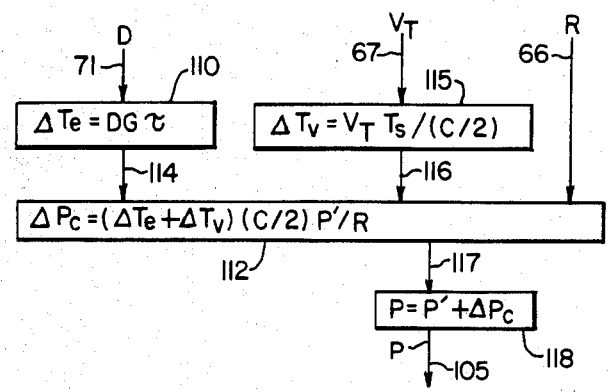
FIG. 5 is one example of a logic flow diagram to perform the function of a variable PRF generator.

FIG. 5 represents a logic flow diagram suitable for processing the input data D, $V_T$, and R to perform the function of variable PRF generator 104. For example, data D arriving on line 71 may be processed in function block 110 where Equation 1 is carried out.

$$\Delta T_e = DG\tau \tag{1}$$

$\Delta T_e$ of Equation 1 represents the early-late gate error in terms of target transit time. D represents the early-late gate error having a value from 0 to 1. G represents the feedback gain having an optimum value of about 0.4. $\tau$ represents the transmitted pulse width of high PRF signals 17 which is also normally the received time or gate width as shown by curve B in FIG. 2. The output of function block 110 is fed to function block 112 over data path 114.

The data $V_T$ is fed over line 67 to function block 115 where $\Delta T_v$ is determind by carrying out Equation 2.

$$\Delta T_v = V_T T_s / (C/2) \tag{2}$$

$\Delta T_v$ represents the change in target transit time due to the movement of the target since the last time PRF calculator 65 had calculated the PRF. $T_s$ represents the sample time or time since the last calculation was performed for the PRF. $V_T$ represents the velocity of the target relative to the radar and C represents the velocity of light. The output of function block 115 is fed to function block 112 over data path 116. R representing target range is fed over line 66 to function block 112. Function block 112 calculates $\Delta P_C$ by carrying out Equation 3.

$$\Delta P_C = (\Delta T_e + \Delta T_v)(C/2)P'/R \tag{3}$$

$\Delta P_C$ or Equation 3 represents the change in PRF which should be made to the present high PRF signals 17 which have not been changed or updated since sample time, $T_s$. P' represents the present PRF of the high PRF signals 17. R represents the target range obtained from tracker 61. The output of function block 112 passes over data path 117 to function block 118 where Equation 4 is carried out to provide a new PRF value P, which will be used if the value of P passes other tests occurring in generators 106 and 108.

$$P = P' + \Delta P_C \tag{4}$$

If the value P passes the other tests in generators 106 and 108, then the value P will be the output of PRF calculator 65 and will pass over line 72 to PRF signal generator 10.

Figure 6:
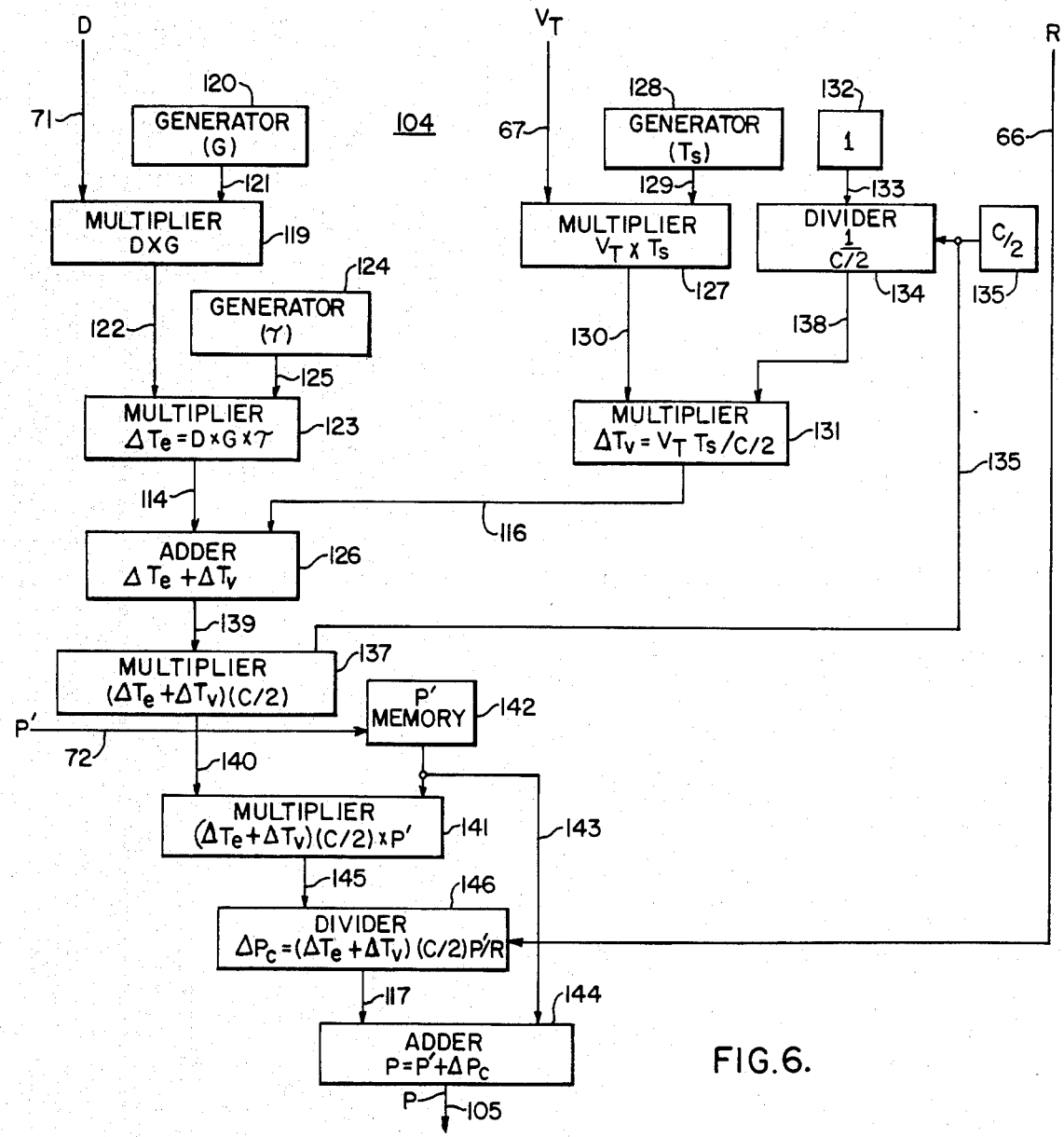
FIG. 6 is a block diagram of one embodiment of a variable PRF generator.

Apparatus to perform the data processing as shown in logic flow diagram FIG. 5 to carry out the function of variable PRF generator 104 is shown in FIG. 6. Signal D passes over line 71 to an input of multiplier 119. Generator 120 provides a signal G over line 121 to a second input of multiplier 119. Multiplier 119 functions to multiply the signal D by the signal G and provides an output over line 122 to an input of multiplier 123. Generator 124 functions to provide a signal $\tau$ over line 125 to an input of multiplier 123. Multiplier 123 multiplies the value D times G times the value $\tau$ which represents $\Delta T_e$ and provides an output over line 114 to an input of adder 126. Signal $V_T$ is coupled over line 67 to an input of multiplier 127. Generator 128 generates a signal $T_s$ which is coupled over line 129 to an input of multiplier 127. Multiplier 127 multiplies the signal $V_T$ by the signal $T_s$ and provides an output over line 130 to an input of multiplier 131. Generator 132 provides a signal representative of the value 1 over line 133 to the numerator input of divider 134. Generator 135 generates a signal representative of the velocity of light divided by 2 or C/2 over line 136 to the denominator input of divider 134 and to an input of multiplier 137. Divider 134 functions to divide the signal C/2 into the value 1. The output of divider 134 is coupled over line 138 to an input of multiplier 131. Multiplier 131 functions to generate $\Delta T_v$ by multiplying the signal on line 130 by the signal on line 138 or $V_T T_s$ times 1/(C/2). The output of multiplier 131 is coupled over line 116 to an input of adder 126. Adder 126 functions to add the signal $\Delta T_e$ to the signal $\Delta T_v$. The output of adder 126 is coupled over line 139 to an input of multiplier 137. Multiplier 137 functions to multiply the signal on line 139 by the signal on line 136. The output of multiplier 137 is coupled over line 140 to an input of multiplier 141. The present PRF P' is coupled over line 72 to memory 142 which functions to store the present value of P'. The output of memory 142 is coupled over line 143 to the input of multiplier 141 and an input of adder 144. Multiplier 141 functions to multiply the signals on line 140 and line 143 together. The output of multiplier 141 is coupled over line 145 to the numerator input of divider 146. The range, R, on line 66 is coupled to the denominator input of divider 146. (Divider 146 functions to divide the numerator input on line 145 by the denominator input on line 66.) Divider 146 generates the signal $\Delta P_C$ which is coupled over line 117 to an input of adder 144. Adder 144 functions to add the signals on line 117 and 143 to generate the signal P on line 105. Generators 120, 124, 128, 132 and 135 may be resistor divider networks or a tap on a potentiometer coupled to a voltage to provide an output voltage representative of the signal.

Figure 7:
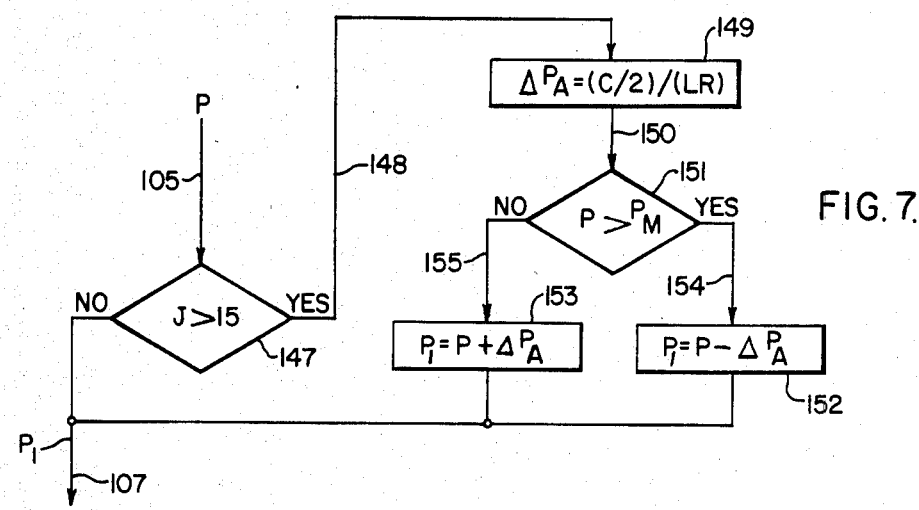
FIG. 7 is one example of a logic flow diagram to perform the function of an acquiring PRF generator.

Referring to FIG. 7, a logic flow diagram is shown suitable for processing the data to perform the function of acquiring PRF generator 106. The new PRF value P from variable PRF generator 104 is coupled over line 105 to decision box 147. If the target reflected signal is being received during the receive time, J is equal to 0. For each sample time, $T_s$, that the target reflected signal 18 is not primarily in the receive gate 34 at the receive time, J is increased 1. If the target reflected signal has not been acquired in, or example, 15 sample times, typically 30 milliseconds, then the PRF will be shifted by $\Delta P_A$, Equation 5.

$$\Delta P_A = (C/2)/(LR) \tag{5}$$

In Equation 5, L represents the number of equal time shifts to be made in reacquiring the target. A typical value for L is 3. A no output from decision box 147 couples P on line 105 over to line 105 as $P_1$. A yes output from decision box 147 is coupled over data path 148 to function box 149. Function box 149 determines $\Delta P_A$ which is coupled over data path 150 to decision box 151. Decision box 51 asks the question if the PRF, P is greater than the arithmetical mean, $P_M$, of the PRF band then if yes, $\Delta P_A$ is subtracted from P in function box 152. If the PRF P is less than the arithmetical mean, $P_M$, of the PRF band, then $\Delta P_A$ is added to P in function box 153. A yes decision from decision box 151 is coupled out on line 154 and a no decision is coupled out on line 155. The output of either function box 152 or function box 153 which determines a new P is coupled to data path 107. Multiple shifts of $\Delta P_A$ are made in the same direction, up in frequency, or down in frequency until J is equal to or less than 15 for example.

Figure 8:
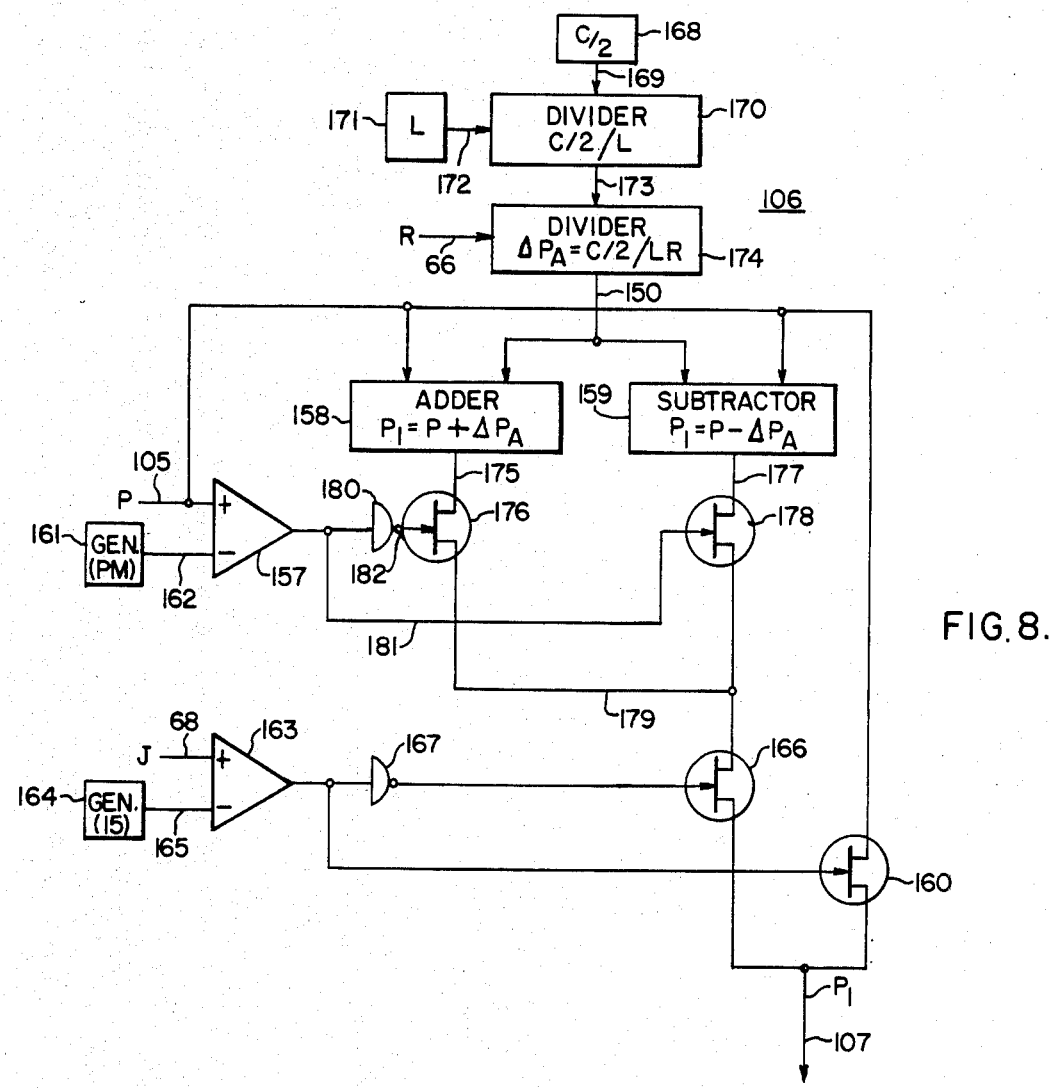
FIG. 8 is a schematic diagram of an acquiring PRF generator.

FIG. 8 shows a schematic diagram suitable for implementing the logic flow diagram of FIG. 7 to carry out the function of acquiring PRF generator 106. Signal P on line 105 is coupled to the positive input of comparator 157, an input of adder 158, an input of subtractor 159 and to one terminal of switch 160. Generator 161 functions to generate a signal $P_M$ representative of the arithmetical mean of the PRF band or midway between the upper and lower PRF limits which is coupled over line 162 to the negative input of comparator 157. Comparator 157 functions to determine whether the input P is greater than the input $P_M$, and if it is to generate a logic 1 which may be represented by a positive voltage. The signal J is coupled over line 68 to the positive input of comparator 163. Generator 164 functions to generate a signal representative of the value fifteen, for example, to the negative input of comparator 163. Comparator 163 functions to compare the input J with the input signal from generator 164 and if the input J is greater to generate an output representative of a logic 1. Otherwise, the output would be represented by a logic 0. The output of comparator 163 is coupled to a control input of switch 166 and an input of NAND gate 167. The output of NAND gate 167 is coupled to a control input of switch 160. Comparator 163, in conjunction with NAND gate 167, functions to turn either switch 166 in the conduction state and switch 160 in the off state if the output is a logic 1. If the output of comparator 163 is a logic 0, then switch 166 would be turned off and switch 160 would be in the conduction state or on. Therefore, if J is less than the value in generator 164, switch 160 will couple P on line 105 to line 107 as PRF $P_1$.

Generator 168 functions to generate a value representative of C/2 which is coupled over line 169 to the numerator input of divider 170. Generator 171 functions to generate a value representative of L which is coupled over line 172 to the denominator input of divider 170. Divider 170 functions to divide the signal on the numerator input by the signal on the denominator input and provide an output over line 173 to the numerator input of divider 174. Signal R is coupled over line 66 to the denominator input of divider 174. Divider 174 functions to divide the signal on the numerator input by the signal on the denominator input and provide an output over line 150 to an input of adder 158 and an input of subtractor 159. The output of divider 174 is the signal $\Delta P_A$. Adder 158 functions to add signal P to signal $\Delta P_A$ to generate a new PRF, $P_1$, Equation 6.

$$P_1 = P + \Delta P_A \tag{6}$$

Subtractor 159 functions to subtract $\Delta P_A$ from P to form a new PRF, $P_1$, Equation 7.

$$P_1 = P - \Delta P_A \tag{7}$$

The output of adder 158 is coupled over line 175 to one side of switch 176. The output of subtractor 159 is coupled over line 177 to one side of switch 178. The other side of switch 176 and 178 are coupled over line 179 to one side of switch 166. The other side of switch 166 and the output of switch 160 are coupled over line 107 to the output.

The output of comparator 157 is coupled over line 181 to an input of NAND gate 180 and to the control input of switch 178. The output of NAND gate 180 is coupled over line 182 to the control input of switch 176. If the value of P on line 105 at comparator 157 is greater than the value generated by generator 161, then comparator 157 will have a logic 1 output which may be represented by a positive voltage. A logic 1 at the input of NAND gate 180 will generate a logic 0 at the output. A logic 0 at the control input will turn switch 176 and switch 178 in the off condition and a logic 1 will turn switch 176 and switch 178 on or in the conduction state. If the output of comparator 157 is a logic 1, then switch 178 will be on and switch 176 will be off. If the output of comparator 157 is a logic 0, then switch 176 will be on and switch 178 will be off. Switches 160, 166, 176, and 178 may, for example, be field effect transistors.

Figure 9:
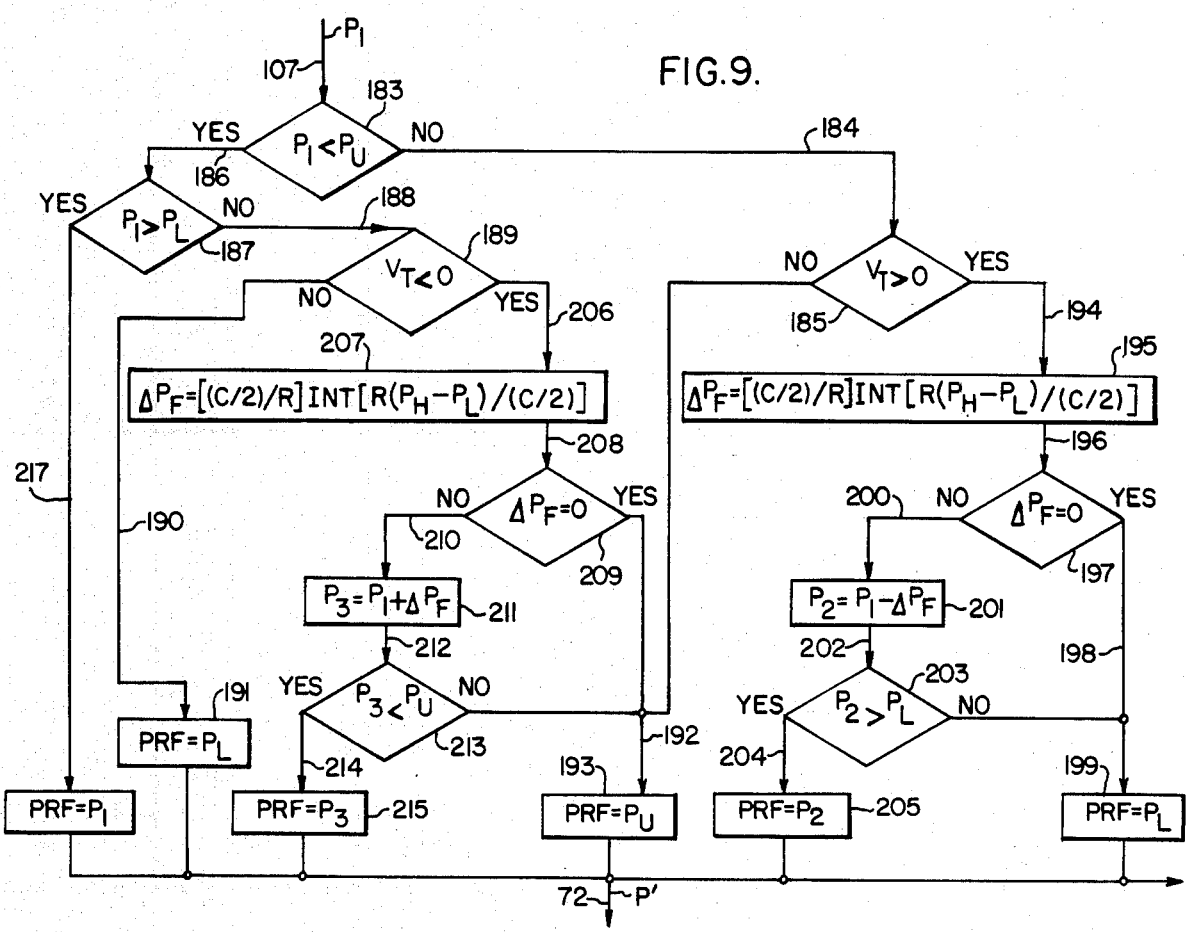
FIG. 9 is one example of a logic flow diagram to perform the function of a PRF jump generator.

Referring to FIG. 9, a logic flow diagram is shown for providing the function of PRF jump generator 108. The output of acquiring PRF generator 106, signal $P_1$, is fed over data path 107 to decision box 183. Decision box 183 functions to determine or compare whether $P_1$ is less than $P_U$, where $P_U$ is the upper limit of the PRF band. Decision box 183 is coupled over data path 184 to decision box 185 for the case where $P_1$ is not less than $P_U$. The output of decision box 183 is coupled over data path 186 to decision box 187 for the case where $P_1$ is less than $P_U$. The output of decision box 187 is coupled to line 72, the output of PRF jump generator 108 for the case where $P_1$ is greater than $P_L$ where $P_L$ is the lower limit of the PRF band. The output of decision box 187 is coupled over data path 188 to the input of decision box 189 for the case where $P_1$ is not greater than $P_L$.

Decision box 185 determines whether the velocity of the target $V_T$ is greater than 0 and decision box 189 determines whether the velocity of the target $V_T$ is less than 0. If $V_T$ is not less than 0, then the output of decision box 189 is coupled over data path 190 to an input of function box 191. Function box 191 functions to set the PRF, P', equal to $P_L$ which is coupled to line 72.

If $V_T$ is not greater than 0, then the output of decision box 185 is coupled over data path 192 to an input of function box 193. Function box 193 functions to set the PRF, P', to $P_U$ which is coupled to line 72.

If $V_T$ is greater than 0, then the output of decision box 185 is coupled over data path 194 to an input of function box 195. In this case at box 195, the PRF is above $P_U$ and the target velocity is above 0. The target has a closing velocity which requires a higher PRF value to maintain the target reflected signals 18 in the receive gate 34 if the same range ambiguity is to be maintained. In order to reduce the PRF below the limit $P_U$, the PRF is jumped or changed to a PRF which would still keep the target reflected signals 18 in the receive gate 34 and would have a smaller range ambiguity. The PRF is lowered by the amount $\Delta P_F$, defined by Equation 8, which is carried out in function box 195.

$$\Delta P_F = [(C/2)/R] INT[R(P_U - P_L)/(C/2)] \quad (8)$$

The output of function box 195 is coupled over data path 196 to the input of decision box 197. Decision box 197 functions to determine or compare whether $\Delta P_F$ equals 0. If $\Delta P_F$ equals 0, then the output of decision box 197 is coupled over data path 198 to an input of function box 199. Function box 199 functions to set the PRF, P', to $P_L$ which is coupled to line 72. For the case where $\Delta P_F$ is 0, this indicates that the PRF cannot be jumped to a PRF corresponding to a smaller range ambiguity which occurs at very short range. At this range, target reflected signals are very strong and easily acquired. The PRF is therefore shifted as far as possible by setting the PRF to $P_L$.

If $\Delta P_F$ does not equal 0, then the output of decision box 197 is coupled over data path 200 to function box 201. Function box 201 functions to jump, change or shift the PRF by the amount $\Delta P_F$ to provide a new PRF, $P_2$, defined by Equation 9.

$$P_2 = P_1 - \Delta P_F \quad (9)$$

The jump in PRF by the amount $\Delta P_F$ is shown by curve B and curve D in FIG. 3 at times T2 and T3 where $P_2$ is the lowest PRF value on curve B and curve D. The output of function box 201 is coupled over data path 202 to decision box 203. Decision box 203 functions to determine or compare whether $P_2$ is greater than $P_L$. If $P_2$ is greater than $P_L$, then the output of decision box 203 is coupled over data path 204 to function box 205. Function box 205 functions to set the PRF, P', to $P_2$ which is coupled to line 72.

If $P_2$ is not greater than $P_L$, then the output of decision box 203 is coupled over data path 198 to an input of function box 199 which sets the PRF, P', to $P_L$, which is coupled to line 72.

If $V_T$ is less than 0, then the output of decision box 189 is coupled over data path 206 to function box 207. Function box 207 functions to determine $\Delta P_F$ as defined by Equation 8. The output of function box 207 is coupled over data path 208 to decision box 209. Decision box 209 functions to determine or compare whether $\Delta P_F$ is equal to 0. If $\Delta P_F$ is equal to 0, then the output of decision box 209 is coupled over data path 192 to an input of function box 193, which will set the PRF, P', to $P_U$ which is coupled to line 72.

If $\Delta P_F$ does not equal 0, then the output of decision box 209 is coupled over data path 210 to function box 211. Function box 211 determines $P_3$ by adding $P_1$ and $\Delta P_F$, as expressed by Equation 10.

$$P_3 = P_1 + \Delta P_F \quad (10)$$

The output of function box 211 is coupled over data path 212 to decision box 213. Decision box 213 determines or compares if $P_3$ is less than $P_U$. If $P_3$ is less than $P_U$, then the output of decision box 213 is coupled over data path 214 to function box 215. Function box 215 functions to set the PRF, P', equal to $P_3$, which is coupled to line 72.

If $P_3$ is not less than $P_U$, then the output is coupled over data path 192 to an input of function box 193 which sets the PRF, P', equal to $P_U$.

Figure 10:
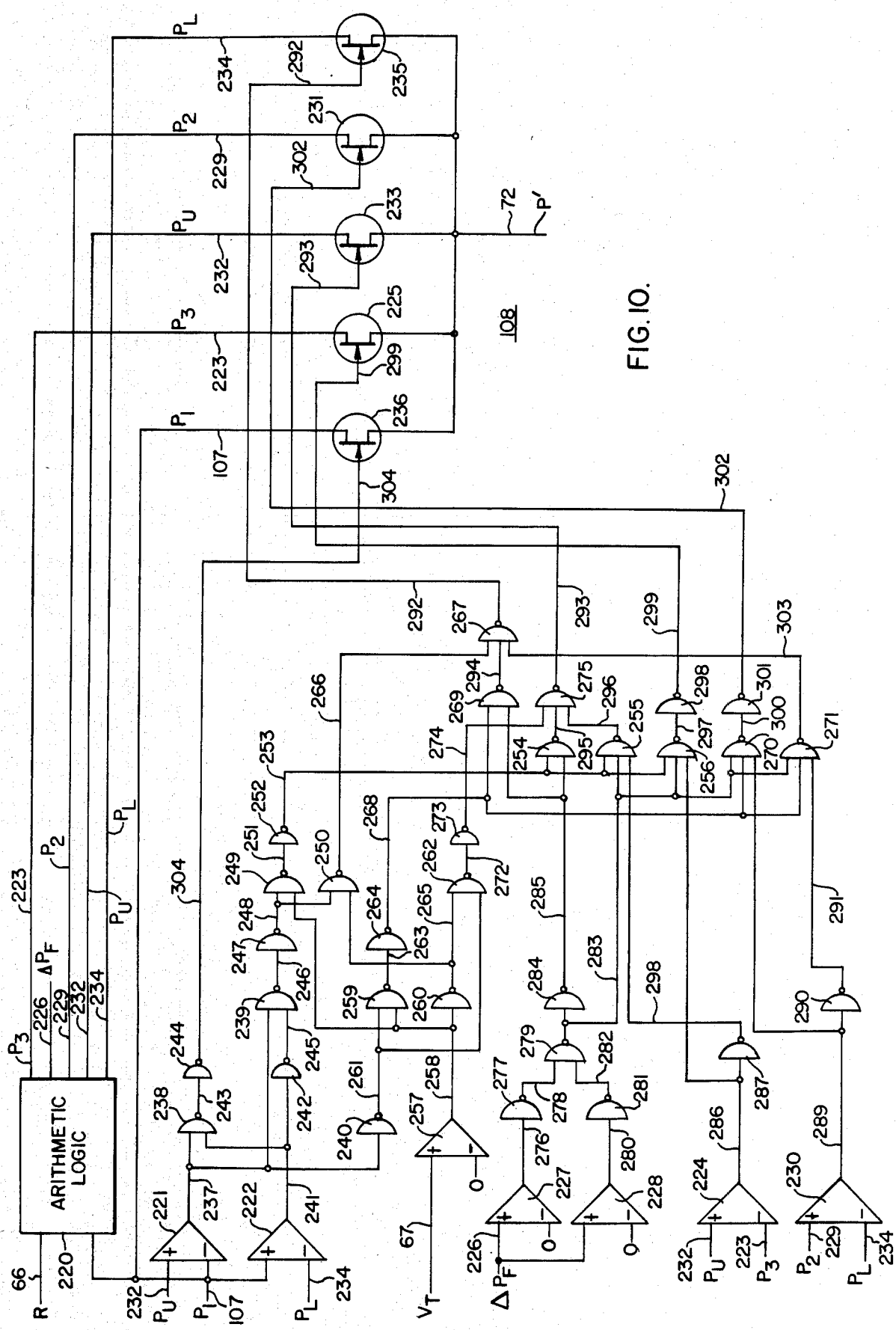
FIG. 10 is a schematic diagram of a PRF jump generator.

Referring to FIG. 10, an embodiment of PRF jump generator 108 is shown which implements the logic flow diagram of FIG. 9. Signal R is coupled over line 66 to an input of arithmetic logic 220. Signal $P_1$ is coupled over line 107 to an input of arithmetic logic 220, a negative input of comparator 221 and a positive input of comparator 222. Arithmetic logic 220 functions to calculate $\Delta P_F$ defined by Equation 8 which is shown in function box 195 and 207 in FIG. 9. $P_2$ defined by Equation 9 is calculated by arithmetic logic 220, which is needed for function box 201 and $P_3$ defined by Equation 10 is calculated by arithmetic logic 220, which is needed for function box 211. In addition, arithmetic logic 220 generates a signal for $P_U$ and $P_L$ which determine the upper and lower PRF limits. Signal $P_3$ is coupled over line 223 from the output of arithmetic logic 220 to a negative input of comparator 224 and an input of switch 225. $\Delta P_F$ is coupled over line 226 from arithmetic logic 220 to a positive input of comparator 227 and 228. $P_2$ is coupled over line 229 from an output of arithmetic logic 220 to a positive input of comparator 230 and an input of switch 231. $P_U$ is coupled over line 232 from an output of arithmetic logic 220 to a positive input of comparator 221 and 224 and an input to switch 233. $P_L$ is coupled over line 234 from an output of arithmetic logic 220 to a negative of comparator 222 and 230 and an input to switch 235. Signal $P_1$ is coupled over line 107 to an input of switch 236. The output of comparator 221 is coupled over line 237 to an input of NAND gates 238, 239 and 240. The output of comparator 222 is coupled over line 241 to an input of NAND gate 238, and 242. The output of NAND gate 238 is coupled over line 243 to an input of NAND gate 244. The output of NAND gate 244 is coupled over line 304 to the control input of switch 236. The output of NAND gate 242 is coupled over line 245 to an input of NAND gate 239. The output of NAND gate 239 is coupled over line 246 to an input of NAND gate 247. The output of NAND gate 247 is coupled over line 248 to an input of NAND gate 249 and 250. The output of NAND gate 249 is coupled over line 251 to an input of NAND gate 252. The output of NAND gate 252 is coupled over line 253 to an input of NAND gates 254, 255 and 256.

Signal $V_T$ is coupled over line 67 to a positive input of comparator 257 with the negative input connected to 0 volts. The output of comparator 257 is coupled over line 258 and to an input of NAND gates 249, 259 and 260. The output of NAND gate 240 is coupled over line 261 to an input of NAND gates 259 and 262. The output of NAND gate 259 is coupled over line 263 to an input of NAND gate 264. The output of NAND gate 260 is coupled over line 265 to an input of NAND gates 250 and 262. The output of NAND gate 250 is coupled over line 266 to an input of NAND gate 267. The output of NAND gate 264 is coupled over line 268 to an input of NAND gates 269, 270 and 271. The output of NAND gate 262 is coupled over line 272 to an input of NAND gate 273. The output of NAND gate 273 is coupled over line 274 to an input of NAND gate 275. The output of comparator 227 is coupled over line 276 to an input of NAND gate 277. The output of NAND gate 277 is coupled over line 278 to an input of NAND gate 279. The output of comparator 228 is coupled over line 280 to an input of NAND gate 281 having an output coupled over line 282 to an input of NAND gate 279. The output of NAND gate 279 is coupled over line 283 to an input of NAND gates 284, 255, 256, 270 and 271. The output of NAND gate 284 is coupled over line 285 to an input of NAND gates 254 and 269. The output of comparator 224 is coupled over line 286 to an input of NAND gates 287 and 256. The output of NAND gate 287 is coupled over line 288 to an input of NAND gate 255. The output of comparator 230 is coupled over line 289 to an input of NAND gate 270 and 290. The output of NAND gate 290 is coupled over line 291 to an input of NAND gate 271. The output of NAND gate 267 is coupled over line 292 to the control input of switch 235. The output of NAND gate 275 is coupled over line 293 to the control input of switch 233. The output of NAND gate 269 is coupled over line 294 to an input of NAND gate 267. The output of NAND gate 254 is coupled over line 295 to an input of NAND gate 275. The output of NAND gate 255 is coupled over line 296 to an input of NAND gate 275. The output of NAND gate 256 is coupled over line 297 to an input of NAND gate 298. The output of NAND gate 298 is coupled over line 299 to a control input of switch 225. The output of NAND gate 270 is coupled over line 300 to an input of NAND gate 301. The output of NAND gate 301 is coupled over line 302 to an control input of switch 231. The output of NAND gate 271 is coupled over line 303 to an input of NAND gate 267. The output of NAND gate 244 is coupled over line 304 to a control input of switch 236. The output of switches 236, 225, 233, 231, and 235 are coupled to the output of PRF jump generator 108 over line 72. Switches 236, 225, 233, 231, and 235 may be, for example, field effect transistors where a logic 1 voltage will turn the transistor fully on into the conduction state and a logic 0 will turn the transistor off into the non-conduction state. For a selected field effect transistor a level shift circuit or driver circuit which is conventional in the art may be necessary to provide voltages at the control input of the switch to cause the transistor to be in the conduction state when a logic 1 is presented and in the non-conduction state when a logic 0 is presented. The comparators are conventional in the art and may be obtained in integrated circuit form and the NAND gates may be, for example, TTL logic having voltage levels for a logic 0 of 0 to 0.3 volts and a logic 1 of 3.5 volts to 5 volts.

Figure 11:
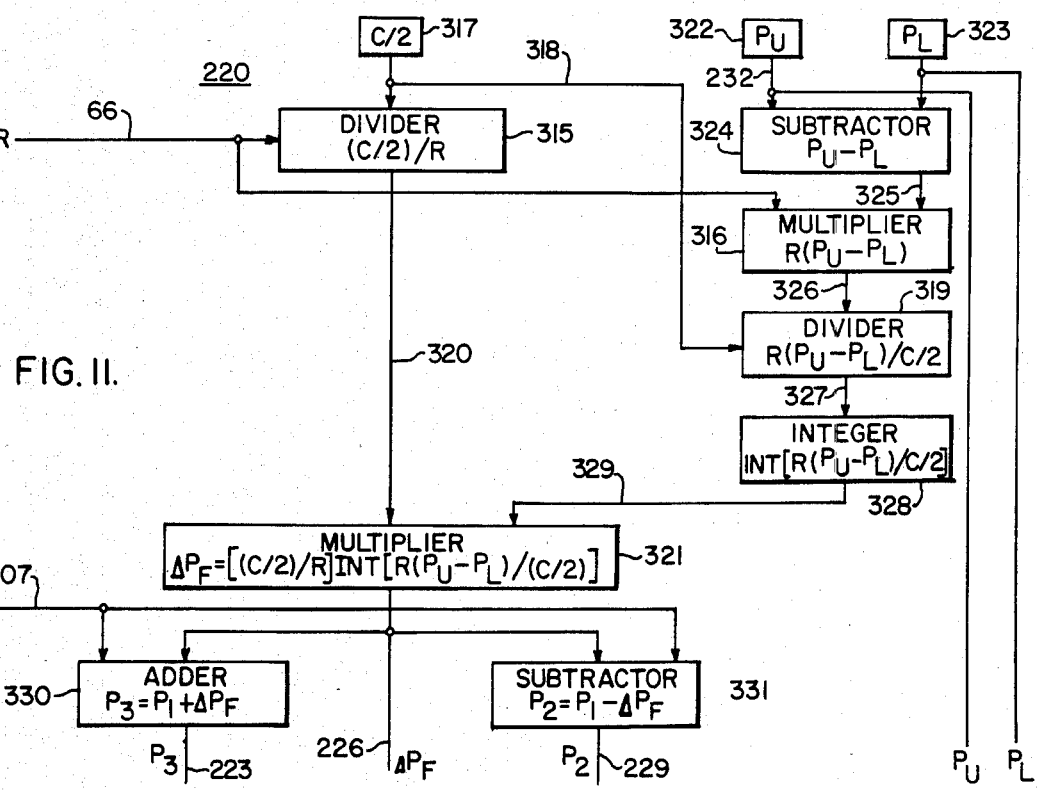
FIG. 11 is a schematic diagram of the arithmetic logic used in the PRF jump generator of FIG. 10; and, FIG. 12 is a schematic diagram of target tracker used in FIG. 1.

A detailed embodiment of the arithmetic logic 220 is shown in FIG. 11. Signal R is coupled over line 66 to the denominator input of divider 315 and an input of multiplier 316. Generator 317 generates a signal indicative of the speed of light, C, divided by 2 which is coupled over line 318 to the numerator input of divider 315 and the denominator input of divider 319. The output of divider 315 is coupled over line 320 to an input of multiplier 321. Divider 315 functions to divide the signal on line 318 by the signal on line 66 to form the product C/2 divided by R, which is coupled over line 320. Generator 322 generates a signal $P_U$ for determining the upper limit of the PRF band which is coupled over line 232 to the positive input of subtractor 324. Generator 323, which functions to generate a signal $P_L$ for the lower limit of the PRF band, which is coupled over line 234 to the minus input of subtractor 324. Subtractor 324 functions to subtract the signal on the negative terminal or line 234 from the signal on the positive terminal or line 232 to form an output signal $P_U-P_L$. The output of subtractor 324 is coupled over line 325 to an input of multiplier 316. Multiplier 316 functions to multiply the inputs together to form an output signal or the product R times $(P_U-P_L)$. The output of multiplier 316 is coupled over line 326 to the numerator input of divider 319. Divider 319 functions to divide the numerator by the denominator to form a signal of the division, R $(P_U-P_L)/(C/2)$. The output of divider 319 is coupled over line 327 to an input of integer 328. Integer 328 functions to lower the input signal on line 327 to an integer, a whole number such as 1,2,3, etc. The output of integer 328 is coupled over line 329 to an input of multiplier 321. Multiplier 321 functions to multiply the input signal over line 320 by the input signal over line 329 to form a signal $\Delta P_F$. The output of multiplier 321, $\Delta P_F$, is coupled over line 226 to an input of adder 330 and a negative input of subtractor 331. Signal $P_1$ is coupled over line 107 to an input of adder 330 and a positive input of subtractor 331. Adder 330 functions to add the signal on line 107, $P_1$, to the signal on line 226, $\Delta P_F$, to form an output signal on line 223, $P_3$. Subtractor 331 functions to subtract the signal on its negative input, $\Delta P_F$, from the signal on the positive input, $P_1$, to form signal $P_2$ on the output, line 229.

Figure 12:
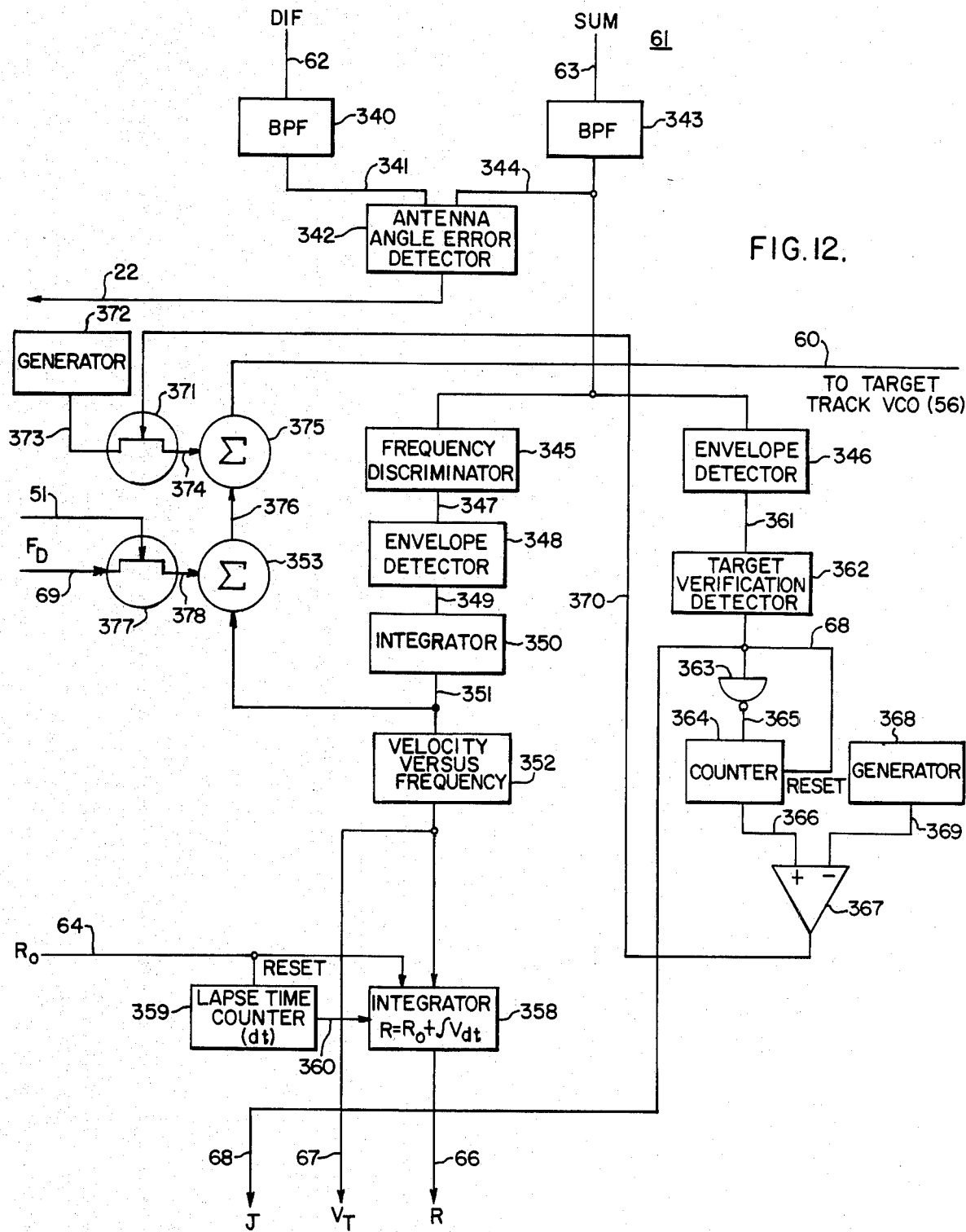

A detailed embodiment of tracker 61 is shown in FIG. 12. The output of track mixer 55 is coupled over line 62 to an input of band pass filter 340. The output of band pass filter 340 is coupled over line 341 to an input of antenna angle error detector 342. The output of track mixer 47 is coupled over line 63 to band pass filter 343. The output of band pass filter 343 is coupled over line 344 to an input of antenna angle error detector 342. Band pass filters 340 and 343 may, for example, have a center frequency of 1 MHz with a pass band of ±500 Hz. The output of antenna angle error detector 342 is coupled over line 22 to an input of motor 21. Motor 21 functions to drive the antenna 16 towards the target in response to the signal over line 22. The output of band pass filter 343 is also coupled over line 344 to an input of frequency discriminator 345 and an input of envelope detector 346. The output of frequency discriminator 345 is coupled over line 347 to an input of envelope detector 348. The output of envelope detector 348 is coupled over line 349 to an input of integrator 350. The output of integrator 350 is coupled over line 351 to an input of velocity versus frequency 352 and to an input of adder 353. The output of velocity versus frequency 352, signal $V_T$, is coupled over line 67 to an input of integrator 358 and to an input of PRF calculator 65. An output from search receiver 48 (FIG. 1) having a signal representative of coarse range, $R_o$, is coupled over line 64 to an input of integrator 358 and to the reset input of lapsed time counter 359. The output of lapsed time counter 359 is coupled over line 360 to an input of integrator 358 to provide the time interval of integration, dt. The output of integrator 358 is coupled over line 66 to an input of PRF calculator 65 which has a signal, R, representative of the range of the target.

The output of envelope detector 346 is coupled over line 361 to an input of target verification detector 362. The output of target verification detector 362, signal J representative of target verification, is coupled over line 68 to an input of NAND gate 363, to the reset input of counter 364 and to an input of PRF calculator 65. The output of NAND gate 363 is coupled over line 365 to an input of counter 364. The output of counter 364 is coupled over line 366 to the positive input of comparator 367. The output of generator 368, which functions to provide a signal indicative of the loss of the target verification signal J after a certain period of time, is coupled over line 369 to the negative input of comparator 367. The output of comparator 367, which is a logic one if the value in counter 364 is greater than the signal from generator 368 is coupled over line 370 to the control input of switch 371. Generator 372 functions to generate a variable voltage such as a ramp voltage going up and going down for searching the target velocity. Generator 372 is coupled over line 373 to one side of switch 371. The other side of switch 371 is coupled over line 374 to an input of adder 375. The output of adder 353 is coupled over line 376 to an input of adder 375. The output of adder 375 is coupled over line 60 to a control input of target track VCO 56. A timing output of search receiver 48 (FIG. 1) is coupled over line 51 to the control input of switch 377. Search receiver 48 has an output signal representative of the doppler frequency, $F_d$, coupled over line 69 to one side of switch 377. The other side of switch 377 is coupled over line 378 to an input of adder 353. Signal $F_d$ is the initial value of the doppler frequency obtained from the search receiver 48 operating in the search mode. Timing signal on line 51 closes switch 377 to a conduction state to allow the initial doppler frequency, $F_d$, to be added in adder 353 at the start of the track mode to initialize the signal on line 60. Switches 371 and 377 may, for example, be field effect transistors which may be turned to the conduction state by an appropriate signal on the control input line. such as a logic one and to the off state by an appropriate signal on the control input line such as a logic 0.

The operation of the embodiment of the invention as shown in FIG. 1 may be described as follows. PRF signal generator 10 generates high PRF signals, for example, from 250 to 260 KHz. An example of a high PRF signal is shown as curve A in FIG. 2 wherein the signal has a 45% duty factor and is constituted by a series of time spaced pulses identified by 1, 2, N−1, N and N+1. The high PRF signals having a duty cycle of 45%, for example, allows for substantial signal power, to be directed towards the target, enabling target reflected signals 18 to provide an optimized signal to noise level due to the 45% time duration duty factor. Transmitter 12 amplifies the high PRF signals which are directed towards a target by antenna 16. Target reflected signals 18 are received by antenna 16 in a sum and difference channel which is conventional in the art and pass through duplexer 14 to the receiver first mixers 24 and 26. Duplexer 14 functions to switch the transmitter output to the antenna during pulses of the high PRF signal 17 and for a time between pulses of the high PRF signals to switch the antenna 16 by means of sum and difference channels 15 and 20 to the first mixers 24 and 26 for reception of target reflected signals 18. Antenna 16 and duplexer 14 are conventional in the art.

The target reflected signals on the sum and difference channel are mixed with a local oscillator in a first mixer 24 for the sum channel and 26 for the difference channel. The local mixer oscillator frequency may be, for example, 9.7 GHz to generate a 300 MHz intermediate frequency. Amplifiers 32 and 37 amplify the signals from mixers 24 and 26 respectively and pass them on to receive gate 34 for the sum channel and receive gate 40 for the difference channel. PRF signal generator 10 generates a signal having a 45% duty cycle such as shown by curve B in FIG. 2 which occurs between the time spaced pulses of the high PRF signal on line 11 for turning on the radar receiver by controlling receive gates 34 and 40. Between each pulse of the high PRF signal the receive gate is turned on for receiving target reflected signals 18.

The action of the receive gate turning on and off at the PRF of the radar results in the generation of side bands. One example of side band generation is the modulation at the PRF of the main beam clutter (MBC). The spurious signals, however, may be eliminated by either of two methods. One is to turn on and turn off the receive gate slowly to increase the rise and decay or fall time of the gating function which may be accomplished by the use of pulse shaper 49 to shape the pulses coming from the PRF signal generator 10 and by a receive gate 34 with longer rise and fall times. With a longer rise and decay time on the control signal of the receive gate the spurious side bands will fall off with frequency much more rapidly than the sin X/X which would be present with a rectangular gating function. The second method is to increase the intermediate frequency (IF) so that the side bands which fall within the pass band of the tracker will be at higher frequencies, and therefore, be lower in amplitude. An IF of 300 MHz or greater will be sufficient for reducing the spurious signals below the level of the receiver noise. Otherwise, the receive gate which operates at the PRF can put video side bands on large returns, such as ground clutter, which can cause spurious signals to fall within the tracking circuitry pass band.

The outputs of receive gate 34 and 40 pass through IF band pass filter 42 and 53, respectively. The band pass filter has a center frequency of 300 MHz with a ±100 KHz pass band. The IF band pass filter covers the doppler band of interest and the signal passes onto the track mixer where the track VCO centers the target being tracked within a narrow band doppler filter. The doppler filter or frequency discriminator is within tracker 61. The track VCO is shown in FIG. 1 as target track VCO 56, which is controlled by a signal over line 60 from tracker 61.

Early-late gate circuitry 70 functions to generate an error signal corresponding to the portion of the target reflected signal received in receive gate 34 during the predetermined time intervals for receiving. The error signal may vary from 0 to 1 and is an indication of whether the target reflected signal is early with respect to the predetermined time interval or whether it is late. PRF signal generator 10 generates early and late gate timing control signals over lines 71A and 72A respectively. An example of an early and late gate timing signal is shown by curves C and D' in FIG. 2. The early gate 44 functions to allow the output of receive gate 34 to pass through early gate 44 under the control of the timing signal from PRF generator 10. The output signal from early gate 44 passes through IF band pass filter 74 to mixer 58. Band pass filter 74 has a center frequency of 300 MHz and a ±100 KHz pass band. Mixer 58 has an input from target track VCO 56. The two signals are mixed in mixer 58 with an output passing through track band pass filter 80 to amplifier 82 and envelope detector 86. The band pass filter has a center frequency of 1 MHz and a pass band of ±500 Hz. The gain of amplifier 82 is controlled by a control input signal over line 83 to provide a constant output from adder 94.

The late gate 45 passes the signal through during the second part or later portion of the predetermined time interval through band pass filter 77 which has similar characteristics as band pass filter 74. The output of band pass filter 77 passes through mixer 59 through track band pass filter 88 which functions similar to mixer 58 and band pass filter 80, respectively. The output of band pass filter 88 passes through amplifier 90 which has a control input signal over line 83 for controlling the gain of amplifier 90 to provide a constant output signal from adder 94. The output of envelope detector 86 and envelope detector 92 are coupled to subtracter 95 which determines the difference between the two input signals. The output passes through low pass filter 102 which has a frequency cut off of approximately 10 Hz. The output of low pass filter 102 is the error signal, D, indicative of whether the received target reflected signals 18 are early or late with respect to the predetermined time interval for reception at receive gate 34.

The output signals from detectors 86 and 92 are summed in adder 94 wherein the output passes to a second adder 97 which has a reference signal input from potentiometer 98 for gain control. The output of adder 97 passes through low pass filter 100 which has a frequency cut off of approximately 10 Hz. The output of the low pass filter 100 passes through amplifier 84 to the control input of amplifiers 82 and 90 and functions to control the gain of amplifiers 82 and 90 so that the input of amplifiers 82 and 90 may accept a large dynamic range of input signals while the sum of the output signal levels or the output of adder 94 is held constant. By using AGC to hold the output of adder 94 constant, the difference signal or output from subtracter 95 is normalized or has a range of values or signal levels to provide a signal indicative of the early or late arrival of target reflected signals 18 in the receive gate 34.

Tracker 61 provides target verification, target velocity and range to PRF calculator 65. Tracker 61 operates in the track mode after the target has been detected in the search mode when the original acquisition of the target is attained. The velocity is determined in the search mode by the target signal location in the doppler filter bank which is located in the search receiver 48. After initiation of the target track mode, target velocity, $V_T$, will continue to be determined by the target tracker 61. Coarse range, $R_o$, may be determined periodically in the search receiver by having the radar operate in a frequency modulation (FM) mode. Coarse range is determined by the search receiver 48 with the radar operating in a frequency modulation (FM) mode. After search receiver 48 has detected the target and determines its velocity and coarse range, the operation of the radar is switched to the track mode whereby the track channel in tracker 61 is tuned to the target's doppler frequency using a narrow band pass filter.

Tracker 61 utilizes coarse range and the target velocity to provide an output range signal for the target. During track mode of operation, the target coarse range, $R_o$, will be obtained by periodically using a ranging mode (e.g. by having the radar operate in a frequency modulation (FM) mode) and updating coarse range, $R_o$, between the periodic range data by integration of the opening or closing velocity as shown by integrator 358 in FIG. 12. Once the target reflected signals have been acquired or centered within the receive gate 34, the amount which the PRF is shifted to compensate for the movement of the target depends upon the range to the target. If the absolute PRF value had to be determined from the target range, the range accuracy would have to be on the order of 0.1% for a target at 50 nautical miles. However, to determine the required change in PRF from the present PRF of the radar for a shift of several range ambiguities, a range accuracy of only 3 to 4% is required. By allowing a single range ambiguity jump (e.g. from N to N−1) a range accuracy of only about 25% is required. A typical tracker such as tracker 61 would have a root mean square (RMS) range accuracy of 1 to 2%. PRF calculator 65 therefore receives range information with sufficient accuracy since PRF calculator 65 determines a change in PRF as opposed to determining an absolute value.

If a target is lost such as due to scintillation where the target reflected signals 18 are weak or close to the noise level, tracker 61 will continue to generate a velocity and range signal for the PRF calculator 65. However, target verification signal J will go to a logic 0 since the target reflected signals out of the track mixer 47 are below a predetermined threshold for detector 362 in FIG. 12. When the target reflected signals out of track mixer 47 are above a predetermined threshold, the output target verification signal J will be a logic 1. The value in generator 164 in FIG. 8 may be increased after initial acquisition so that acquiring PRF generator is inhibited for a time period such as 6 seconds to allow recovery of faded signals due to scintillation. In addition tracker 61 utilizes the output of track mixer 55 along with the output of track mixer 47 to determine the angular direction of the target being tracked, antenna angle error detector 342 which is conventional in the art.

PRF calculator 65 functions to acquire the target reflected signals 18 in receive gate 34 to maintain the target reflected signals within the receive gate 34 and to jump the PRF or reset the PRF to hold the PRF within upper and lower PRF limits. Referring now to FIG. 4, variable PRF generator 104 functions to vary the PRF by a small amount or increment every time sample, such as 2 milliseconds to maintain the target reflected signals 18 within the receive gate 34 or within the predetermined time interval. The PRF is varied or modified every sample time $T_s$ as determined by generator 128 in FIG. 6 which may be, for example, 2 milliseconds. The PRF is varied or modified by $\Delta P_C$ as defined by Equation 3. The terms $\Delta T_e$ and $\Delta T_v$ may be positive or negative. The new PRF P is defined by Equation 4 wherein $\Delta P_C$ is added to the present PRF P'. If the target is closing or approaching the radar, $\Delta T_v$ is positive and if the target is opening or the target is moving away from the radar, $\Delta T_v$ is negative. $\Delta T_e$, which is defined by Equation 1, is a measure of the error of alignment or centering of the target reflected signals 18 in the receive gate or predetermined time interval which occurs between pulses of the high PRF signal. As can be seen in FIG. 1, low pass filter 102 limits the frequency response of the error signal D to 10 Hz and below. Therefore, errors in alignment or centering of the target reflected signals in the receive gate are corrected gradually after many sample times $T_s$. Variable PRF generator 104 will continue to vary or modify the PRF even though target verification or the target reflected signal has been lost since tracker 61 will continue to generate a target velocity, $V_T$ for the target based on prior target information.

Acquiring PRF generator 106 functions to acquire the target reflected signals 18 within the receive gate 34 or predetermined time interval, such as shown by curve B in FIG. 2. Curve E of FIG. 2 shows target reflected signals which are centered within the receive time of curve B which would represent a fully acquired signal. If target verification signal J is a logic 0 for such as 15 sample times, $T_s$, when the radar is switching from the search mode to the track mode then $\Delta P_A$ as defined in Equation 5 would be added to the PRF signal generated by variable PRF generator 104 if it is less than the mean PRF $P_M$. If the PRF output of variable PRF generator 104 is greater than the mean PRF, $P_M$, then the term $\Delta P_A$ is subtracted from the PRF, P to generate the new PRF $P_1$ in accordance with Equation 7. The output of generator 171, signal L, is chosen such that $\Delta P_A$, as defined in Equation 5, will vary the PRF in a manner that will result in placing the target reflected signals 18 in the receive gate 34 within a few sample times. Once the target reflected signals arrive at a time coincident with the receive time of the receive gate, track mixer 47 will have an output due to the target reflected signals which would cause target verification signal J to go to a logic 1. When J is a logic 1, acquiring PRF generator 106 passes the input PRF signal arriving from variable PRF generator 104 on to its output $P_1$ without any changes. Acquiring PRF generator 106 is therefore used on a short time basis for the case of originally acquiring the target reflected signals within the receive gate or at some other time when the target reflected signals are allowed to drift or fade out of the receive gate and several seconds have passed, for example.

PRF jump generator 108 functions to jump or change or reset the PRF to hold the PRF within the upper and lower PRF limits. A typical PRF upper limit would be 260 KHz and a lower limit would be 250 KHz. The mean PRF then would be 255 KHz. Various PRF and PRF limits could be used. The PRF limits are usually determined by other factors outside of the radar design area. FIG. 3 shows the PRF limits $P_U$ and $P_L$ and the mean PRF $P_M$. Curve A represents the change in PRF governed by variable PRF generator 104 for a closing target. If the target is opening or going away from the radar, then curve A would have a negative slope with the PRF decreasing. PRF jump generator 108 will have an output PRF equal to the input PRF, $P_1$, if $P_1$ has a PRF between $P_L$ and $P_U$. However, when $P_1$ exceeds $P_U$, as shown by curve A at time T2, then PRF jump generator 108 will reset the PRF by an amount $\Delta P_F$ as defined by Equation 8. $P_2$ is the new PRF as defined by Equation 9 for the case of a closing target. At time T2 in FIG. 3, the upper and lower ends of curve B are determined by $P_1$ and $P_2$ and the length of curve B represents $\Delta P_F$. While the target is being tracked and the PRF is modified every sample time $T_s$, as illustrated in curve A of FIG. 3, the range to the target is represented by N range ambiguities where one range ambiguity represents the distance one pulse of the high PRF signal will travel before the next pulse. At short target ranges the change in range ambiguity, N, may be 1. At target ranges of, for example, 50 nautical miles, the change in range ambiguity may be 1 or as large as 6. The change in range ambiguity is another way of looking at target tracking. Discrete changes made in the PRF would be adjusted by $\Delta P_F$, to maintain the target reflected signal within the receive gate. Thus, at each change in the PRF by $\Delta P_F$, the range ambiguity to the target is changed by an integral amount. Mathematically, the change is determined by the integer or round-off of the quantity $[R \times (P_U - P_L)/(C/2)]$ which is the last portion of Equation 8 and which is the output of integer 328 in FIG. 11. At very short ranges where the range ambiguity is 1, no change in the range ambiguity can occur since this is the minimum range ambiguity, since if the range ambiguity was 0, then $\Delta P_F$, in accordance with Equation 8, would also be 0. When $\Delta P_F$ is equal to 0, the PRF is set either at $P_L$ for a closing target and $P_U$ for an opening target.

FIG. 11 shows a detailed embodiment of the arithmetic logic 220 of FIG. 10 which provides the calculation of $\Delta P_F$, $P_2$ and $P_3$. Generator 322 generates the signal for $P_U$, the upper PRF limit, and generator 323 generates the signal $P_L$, the lower PRF limit. Target range is the only target information necessary for calculating $\Delta P_F$. FIG. 10 shows control logic for providing a jump in the PRF or for setting the PRF to the upper or lower limit, depending upon the value of the present PRF and whether the target velocity is opening or closing. The control logic implementing the logic flow chart of FIG. 9 is designed to maintain the PRF between the upper and lower PRF limit. If $P_1$ is between $P_U$ and $P_L$, the output will be $P_1$. If $P_1$ is less than $P_U$ and $P_L$, and if $V_T$ is less than 0, and if $\Delta P_F$ does not equal 0, and $P_3$ is less than $P_U$, then the output will be $P_3$. If $P_1$ is less than $P_U$ and less than $P_L$, $V_T$ is less than 0, $\Delta P_F$ does not equal 0 and $P_3$ is greater than $P_U$, then the output P' is set to $P_U$. This is for the case where the jump and $\Delta P_F$ cause the PRF to go clear across the PRF band. If $P_1$ is less than $P_U$ and $P_L$, $V_T$ is less than 0 and $\Delta P_F$ equals 0, then the output P' is set to $P_U$. This is for the case where the range is very short and no jump and PRF can be made. If $P_1$ is less than $P_U$ and $P_L$ and $V_T$ is greater than 0, then the output P' is set to $P_L$. This is for the case where the target is closing and $P_1$ is less than $P_L$ which should not occur. If $P_1$ is greater than $P_U$, $V_T$ is greater than 0, $\Delta P_F$ does not equal 0 and $P_2$ is greater than $P_L$, then the PRF P' is set to $P_2$. If $P_1$ is greater than $P_U$ and $V_T$ is less than 0, then the PRF, P' is set to $P_U$. This is for the case where $P_1$ is above $P_U$ for an opening target which should not occur. If $P_1$ is greater than $P_U$, $V_T$ is greater than 0, $\Delta P_F$ does not equal 0 and $P_2$ is less than $P_L$, then the PRF P' is set to $P_L$. This is for the case where the jump frequency $\Delta P_F$ traverses the entire PRF band and is outside the limits on the other side. If $P_1$ is greater than $P_U$, $V_T$ is greater than 0 and $\Delta P_F$ equals 0, then the PRF P' is set to $P_L$. This is for the case where the target is at very close range and the PRF cannot be jumped another range ambiguity. The logic in FIG. 10 is conventional in the art and implements the description just provided for setting the PRF, P'.

PRF calculator 65 having inputs of target range, target velocity, target verification and an early-late gate error signal governs and modifies the PRF within upper and lower PRF limits to acquire the target reflected signals within the receive gate, to maintain the target reflected signals within the receive gate and to jump the PRF to hold the PRF within the upper and lower PRF limits.

The operation of tracker 61 as shown in the embodiment of FIG. 12 is described as follows. The output of sum channel track mixer 47 and the difference channel track mixer 55 are fed to band pass filter 343 and band pass filter 340 respectively. The outputs of band pass filter 343 and 340 are fed to antenna angle error detector (phase) 342 which functions to generate a signal to drive the antenna motor 21 in the direction of the target 19. Antenna angle error detector 342 is conventional in the art. The output of sum channel band pass filter 343 is processed by envelope detector 346 and target verification detector 362 which generates a target verification signal, J. The output of sum channel band pass filter 343 is also processed by frequency discriminator 345 and envelope detector 348 to generate an error voltage indicative of the target frequency out of track mixer 47 with respect to its position in frequency discriminator 345. The error voltage on line 349 is coupled to an input of integrator 350 which has an output representative of the absolute doppler frequency of the target relative to the radar, such as opening or closing velocity. Integrator 350 has a typical output voltage of from 0 to +10 volts. The output of integrator 350 is coupled to an input of velocity versus frequency 352 which transforms the voltage representative of frequency to a voltage representative of the velocity of the target relative to the radar, such as opening or closing velocity, $V_T$. The output of velocity versus frequency 352, signal $V_T$, is coupled to an input of integrator 358 which also has an input from search receiver 48 representative of range, $R_o$. Search receiver 48 is used periodically to determine range, $R_o$, in the search receiver by FM ranging. The lapsed time between FM ranging wherein $R_o$ is updated is counted in lapsed time counter 359. When a new range, $R_o$ is provided over line 64 to integrator 358, the signal, $R_o$, also resets lapsed time counter 359 to 0 through the reset input. The output of the lapsed time counter 359 has a signal representative of dt or the lapsed time since the range signal $R_o$ was updated and coupled over line 360 to integrator 358. Integrator 358 functions to add $R_o$ to the integral of the velocity over the time dt according to Equation 11. The output of integrator 358 on line 66 is the range signal, R, $$R = R_o + \int V dt \tag{11}$$

The output of target verification detector 362, signal J, is inverted by NAND gate 363. The output of NAND gate 363 is counted in counter 364 which counts when the output of NAND gate 363 is a logic 1 or when the output of target verification detector 362 is a logic 0. If the output of target verification detector 362, signal J, is a logic 1, then counter 364 is reset by line 68. Therefore, counter 364 counts the duration of the time when the output of target verification detector 362, signal J, is a logic 0. The output of counter 364 is coupled to the positive input of comparator 367. Generator 368 generates a signal representing a certain period of time that the target reflected signal 18 may be lost before the tracker could search in velocity for the target reflected signal 18. A typical value for generator 368 would be for the output of target verification detector 362, J, to be a logic 0 for 1000 consecutive sample times or 2 seconds where each sample time represents the time between updating the PRF, $T_s$ such as 2 milliseconds. When the counter exceeds the signal generated by generator 368, the output of comparator 367 will be a logic 1 which will turn switch 371 into the conduction state. When 371 is in the conduction state, generator 372 will be coupled to an input of adder 375. Generator 372 will generate a ramp voltage with positive and negative slope such as two legs of a triangle to search in velocity for the target reflected signal 18. The output of adder 375 is coupled to the control input of target track voltage controlled oscillator (VCO) 56 (FIG. 1) which controls the output frequency on line 57. Search receiver 48 (FIG. 1) provides a timing signal on line 51 to turn switch 377 in the conduction state at changeover time from search to track mode. Search receiver 48 provides a doppler frequency signal, $F_d$, on line 69 which passes through switch 377 to adder 353, which functions to provide an initial signal to track VCO 56 and back through band pass filter 343 to initialize integrator 350 at the start of the track mode.

The invention provides a method and apparatus for tracking a moving target in a high PRF radar wherein coarse target information is available by generating a high PRF signal which is constituted by a series of time spaced pulses, transmitting the high PRF signal, receiving all or at least a portion of a reflected high PRF signal indicative of a target during a predetermined time interval between the time spaced pulses, reducing spurious signals below a predetermined level which were incidentally generated by intermittent receiver operation, generating a velocity signal in accordance with an acquired target, generating an error signal which corresponds to the portion of the reflected signal received during the predetermined time intervals, and modifying the PRF of the transmitted signal in accordance with the target velocity, coarse range and generated error signal to increase the portion of the reflected signal received during the predetermined time interval.

I claim:

1. A method of tracking a moving target in a high PRF radar mode wherein initial target range and doppler frequency information is provided, comprising
    generating a high PRF signal, said signal being constituted by a series of time spaced pulses,
    transmitting said high PRF signal,
    repeatedly receiving at least a portion of one of said pulses of target reflected high PRF signal during a predetermined receive time interval between said time-spaced pulses of said high PRF signal being transmitted,
    reducing spurious signals in the target reflected high PRF signal below a predetermined level which are incidentally generated by modulation of the main beam clutter, said modulation results from receiving during said predetermined receive time intervals,
    tracking the doppler frequency of said target reflected signals to provide a signal indicative of target velocity,
    generating a target range signal indicative of the present target range utilizing said initial range, target velocity signal and the time lapsed from the time of the initial range measurement,
    repeatedly comparing the arrival of one of said pulses of a target reflected high PRF signal with said predetermined receive time interval to provide an early/late signal indicative of whether said pulse of a target reflected high PRF signal is centered with respect to said predetermined receive time interval,
    varying the PRF of said high PRF signal by calculating a new PRF based upon said target range, target velocity and early/late signal to align said pulses of said target reflected signal towards the center of said predetermined receive time intervals.

2. The method of claim 1 wherein said step of reducing spurious signals in the target reflected high PRF signal below a predetermined level includes the step of mixing said target reflected high PRF signal with a first frequency to provide an intermediate frequency above 300 MHz.

3. The method of claim 1 wherein said step of reducing spurious signals in the target reflected high PRF signal below a predetermined level includes the step of shaping the rise and fall time of the edges of said predetermined receive time interval.

4. The method of claim 1 wherein said step of comparing the arrival of one of said pulses of a target reflected high PRF signal includes the steps of:
generating a first signal corresponding to the portion of the reflected signal received during a first part of said predetermined receive time interval,
generating a second signal corresponding to the portion of the reflected signal received during a second part of said predetermined receive time interval, and
combining arithmetically said first and second signals to form said early/late signal.

5. The method of claim 1 further including the steps of:
generating a target verification signal from said pulses of said target reflected high PRF signal received during said predetermined receive time intervals indicative of the absence of said pulses of said target reflected high PRF signal during said predetermined receive time intervals,
calculating a first signal indicative of a change in PRF based upon target range and a constant L, said constant L represents the number of equal time shifts to be made in reacquiring the target, and
changing the PRF of the transmitted signal in accordance with said first signal at times when said target verification signal exceeds a predetermined value to reacquire said target.

6. The method of claim 1 further including the steps of:
comparing said new high PRF signal with a predetermined upper PRF limit, and
changing said new high PRF signal below said upper PRF limit at times when said new high PRF signal exceeds said upper PRF limit.

7. The method of claim 1 further including the steps of:
comparing said new high PRF signal with a predetermined lower PRF limit, and
changing said new high PRF signal above said lower PRF limit at times when said new high PRF signal is less than said lower PRF limit.

8. A pulse doppler radar for tracking a moving target wherein initial target range and doppler frequency information is provided, comprising:
means for generating a high PRF signal, said signal being constituted by a series of time spaced pulses,
means for transmitting said high PRF signal,
means for repeatedly receiving at least a portion of one of said pulses of a target reflected high PRF signal during a predetermined receive time interval between said time-spaced pulses of said high PRF signal being transmitted,
means for reducing spurious signals in the target reflected high PRF signal below a predetermined level which are incidentally generated by modulation of the main beam clutter, said modulation results from receiving during said predetermined receive time intervals,
means for tracking the doppler frequency of said target reflected signals to provide a signal indicative of target velocity,
means for generating a target range signal indicative of the present target range utilizing said initial range, target velocity signal and the time lapsed from the time of the initial range measurement,
means for repeatedly comparing the arrival of one of said pulses of a target reflected high PRF signal with said predetermined receive time interval to provide an early/late signal indicative of whether said pulse of a target reflected high PRF signal is centered with respect to said predetermined receive time interval,
means for varying the PRF of said high PRF signal by calculating a new PRF based upon said target range, target velocity and early/late signal to align said pulses of said target reflected signal towards the center of said predetermined receive time intervals.

9. The pulse doppler radar of claim 8 wherein said means for reducing spurious signals in the target reflected high PRF signal below a predetermined level includes means for mixing said target reflected high PRF signal with a first frequency to provide an intermediate frequency above 300 MHz.

10. The pulse doppler radar of claim 8 wherein said means for reducing spurious signals in the target reflected high PRF signal below a predetermined level includes means for shaping the rise and fall time of the edges of said predetermined receive time interval.

11. The pulse doppler radar of claim 8 wherein said means for comparing the arrival of one of said pulses of a target reflected high PRF signal includes:
means for generating a first signal corresponding to the portion of the reflected signal received during a first part of said predetermined receive time interval, and
means for generating a second signal corresponding to the portion of the reflected signal received during a second part of the said predetermined receive time interval, and means for combining arithmetically said first and second signals to form said early/late signal.

12. The pulse doppler radar of claim 8 further including:
means for generating a target verification signal from said pulses of said target reflected high PRF signal received during said predetermined receive time intervals indicative of the absence of said pulses of said target reflected high PRF signal during said predetermined receive time interval,
means for calculating a first signal indicative of a change in PRF based upon target range and a constant L, said constant L represents the number of equal time shifts to be made in reacquiring the target, and
means for changing the PRF of the transmitted signal in accordance with said first signal at times when said target verification signal exceeds a predetermined value to reacquire said target.

13. The pulse doppler radar of claim 8 further including:

means for comparing said new high PRF signal with a predetermined upper PRF limit, and means for changing said new high PRF signal below said upper PRF limit at times when said new high PRF signal exceeds said upper PRF limit.

14. The pulse doppler radar of claim 8 further including:

means for comparing said new high PRF signal with a predetermined lower PRF limit, and means for changing said new high PRF signal above said lower PRF limit at times when said new high PRF signal is less than said lower PRF limit.

* * * * *